United States Patent [19]
Jones

[11] 3,762,084
[45] Oct. 2, 1973

[54] FISH MOBILE
[76] Inventor: Alene H. Jones, Rt. 1, Box 23, Denver, N.C. 28037
[22] Filed: Mar. 7, 1972
[21] Appl. No.: 232,580

[52] U.S. Cl.......................... 40/138, 40/128, 40/126
[51] Int. Cl............................................ G09f 19/02
[58] Field of Search..................... 40/138, 128, 126; 46/32

[56] References Cited
UNITED STATES PATENTS
D188,188   6/1960   Graves............................ 40/128 X
2,769,276  11/1956   Steiner.................................. 46/32
2,994,156   8/1961   Steiner et al.......................... 46/32

Primary Examiner—Robert W. Michell
Assistant Examiner—Wenceslao J. Contreras

[57] ABSTRACT

An oramental mobile which is suspended by a single thin wire from a support, the mobile being comprised of a pair of horizontal crossing arms secured at the junction to the depending wire, each of the crossing arms at their outer ends supporting individual arms on depending wires there from which support fish shaped figures which are made of braided ribbons of various colors, the ends of the ribbons forming fins, and a button being secured to each side of the fish like figure so to represent eyes.

1 Claim, 6 Drawing Figures

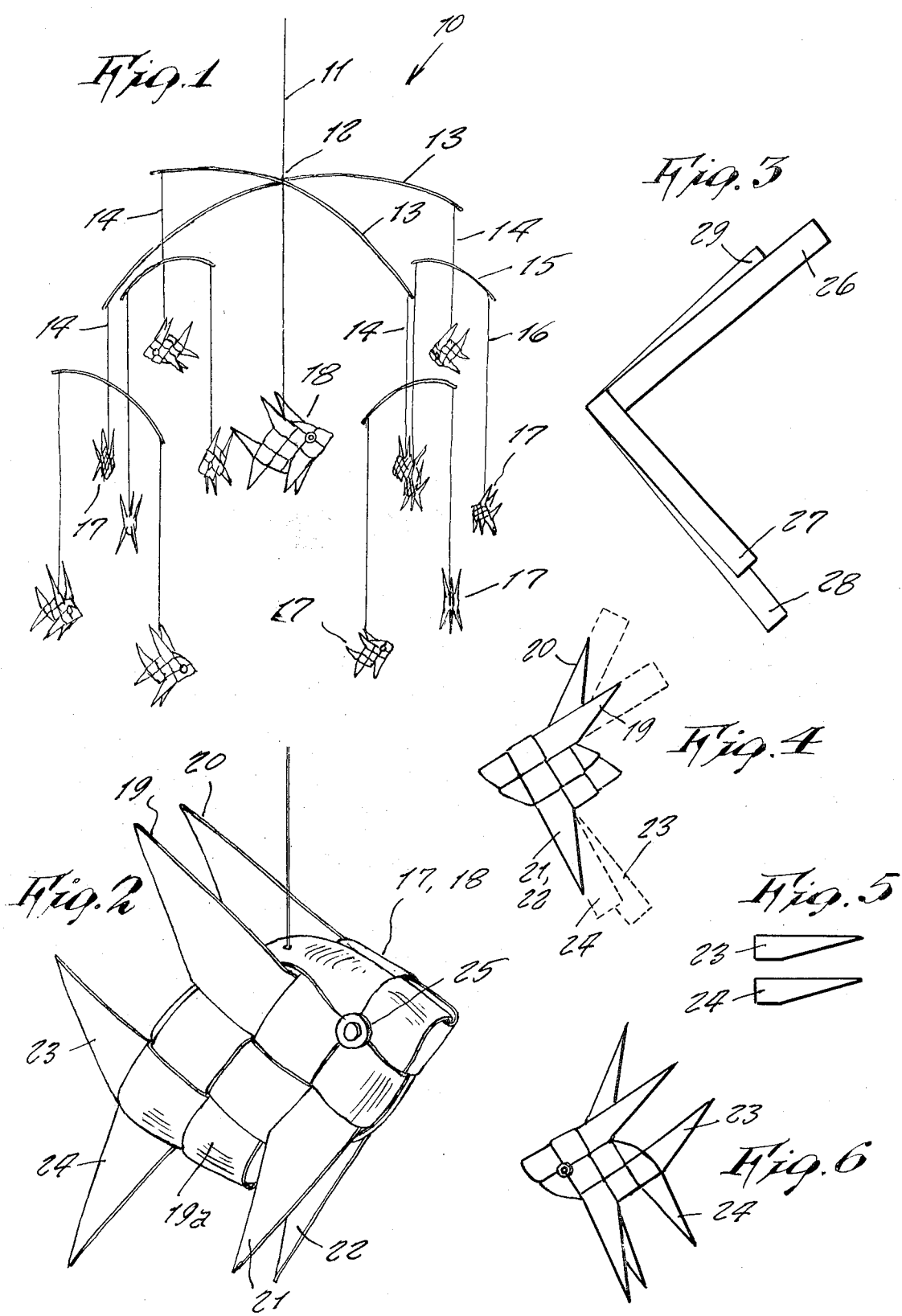

FISH MOBILE

This invention relates generally to decorative displays. More specifically it relates to ornamental mobiles.

A principal object of the present invention is to provide a mobile in which a collection of fish shaped figures are suspended upon wires so that when the mobile is rotating in a light air current, the fish shaped figures give the impression of a school of fish traveling through the water.

Another purpose of the present invention is to provide fish mobile in which each of the fish figures are made in a novel manner by being formed of braided ribbons.

Another purpose of the present invention is to provide a fish mobile in which the fish figures are made of ribbon material that is attractively colored and which is of an iridescent shine such as can be accomplished by means of nylon, silk or other equivalent material so that the fish figures give the appearance of exotic tropical fish.

Still another purpose of the present invention is to provide an fish mobile which can be made in different size models so to have a smaller or larger number of fish figures incorporated therein.

Other objects of the present invention are to provide a fish mobile which is simple in design, inexpensive to manufacture, rugged in construction, easy to use and efficient in operation.

These and other objects will be readily evident upon a study of the following specification and the accompanying drawing wherein:

FIG. 1 is a perspective view of the present invention.

FIG. 2 is a perspective view of one of the fish figures.

FIGS. 3 through 6 show progressive steps in the construction of one of the fish figures.

Referring now to the drawing in detail, the reference numeral 10 represents a fish mobile according to the present invention wherein there is a thin wire 11, the upper end of which is attachable to any overhead support, the intermediate portion of the wire being secured to a junction 12 of a pair of horizontally crossing arms 13 made of any suitable material such as a wire or wood. The outer ends of the crossing arms 13 each support a depending wire 14 each of which supports a depending, horizontally extending arm 15, the outer ends of the arms 15 each supporting a pair of wires 16 to the lower end of which there is attached a three dimensional fish figure 17. Each of the lower ends of the wires 14 likewise support a similar fish figure 17. The lower end of the wire 11 supports a relatively larger sized fish figure 18 at its lower end.

Each one of the fish figures 17 and 18 is made of ribbon material that is braided so to form a three dimensional shell, and which forms the body 19 of the fish. The terminal ends of the ribbons serve to form the extending fins of the fish figure, thus a pair of ends 19 and 20 form the fins on top of the fish body 19, another pair of fins 21 and 22 being formed underneath the body 19 made of another pair of ribbon ends, while another pair of ribbons ends form the tail fins 23 and 24. A pair of buttons 25 secured upon opposite sides of the fish body 19 serve as fish eyes. Such fish eyes may alternately be made of bright colored sequences.

In the manufacture of each one of the fish figures, the following steps are undertaken. Cut two pieces of ribbon 11 ½ inches for the small fish, and two pieces 20 inches for the large fish. Fold each piece together leaving one end about 1 inch shorter. Fold both pieces together, as shown in FIG. 3. Take end 26 under end 27 and fold lightly over end 27. Take end 28 over end 26 and under 26, twist the hand forward and insert over end 29 under end 26, and then tighten. Be careful and do not mash the ribbon. Pick up end 26 in left hand and loop the end 28 under 26, holding it loosely. Take end 29 over end 26 and hold. Take end 27 around end 28, over end 29, under end 28 and turn over. Take end 26 and insert under end 28, take end 29 over end 27 and insert under end 26 and tighten there after. Be careful and do not mash the ribbon. Trim all four ends to make the fins, as shown in FIG. 4. Trim ends 27 and 28 to make the tail fins 23 and 24. This is shown in FIG. 5. Glue the end pieces 23 and 24 in open space so to make the tail fins; as shown in FIG. 6. Glue the two sequence or buttons 25 on each fish as shown. Cut two pieces of wire 12 ½ inches for cross section and the four pieces 5 ½ inches for the four arms 15. Using sewing needle and cotton thread to string and balance the 12 small fish, and one large fish for the small mobile, and 20 small fish and two large fish for the large mobile. The large mobile takes eight pieces of small wire 5 ½ inches long. Glue a thumb tack on the long string or wire 11 at its top. After hanging, use plyers to crease the wire at each end, then put a small amount of glue on each end to keep the thread from falling off. After the glue is dried, pack carefully into a box with tissue paper.

Thus there is provided a fish mobile.

What I now claim is:

1. A fish mobile comprising a plurlity of horizontally extending arms supported by said wires, each of said arms supporting of depending wires, the lower ends of which support a fish made of ribbons folded over and braided so to produce a three dimensional shell forming said fish figure, having a pair of fins on top of a body of said fish, a pair of fins on the underside of said fish body, a pair of sequins glued on each side of said fish body to represent eyes, a knotted thread to secure said body of fish to said horizontally extending arms and hanging freely therefrom, another long thread attached to middle of aid horizontally arms with thumb tack glued on other light-weight of said thread to hang on ceiling, a plurality of said fish made of assorted colors and of a ight-weight material, wherefore the resultant fish figures thus rotating in a light air current, the fish shaped figures giving appearance of an exotic tropical fish aquarium to create an ornamental mobile, otherwise a plurality of said fish figures unattached to said mobile, used for decorative display in restaurants, fish camps and homes for the entire family.

* * * * *